(12) United States Patent
Bromfield et al.

(10) Patent No.: US 7,598,295 B2
(45) Date of Patent: Oct. 6, 2009

(54) USE OF A SOURCE OF CHROMIUM WITH A PRECIPITATED CATALYST IN A FISCHER-TROPSCH REACTION

(75) Inventors: Tracy Carolyn Bromfield, Vanderbijlpark (ZA); Rentia Visagie, Sasolburg (ZA)

(73) Assignee: Sasol Technology (PTY) Limited, Johannesburg (ZA)

( * ) Notice: Subject to any disclaimer, the term of this patent is extended or adjusted under 35 U.S.C. 154(b) by 0 days.

(21) Appl. No.: 10/580,022

(22) PCT Filed: Nov. 18, 2004

(86) PCT No.: PCT/IB2004/052471

§ 371 (c)(1), (2), (4) Date: Mar. 5, 2007

(87) PCT Pub. No.: WO2005/049765

PCT Pub. Date: Jun. 2, 2005

(65) Prior Publication Data

US 2007/0191498 A1    Aug. 16, 2007

(30) Foreign Application Priority Data

Nov. 20, 2003 (ZA) .................... 2003/9038

(51) Int. Cl.
*C07C 27/00* (2006.01)
(52) U.S. Cl. .............. 518/719; 518/714; 518/715; 518/720; 518/721
(58) Field of Classification Search ......... 518/719–721, 518/714, 715
See application file for complete search history.

(56) References Cited

U.S. PATENT DOCUMENTS

| | | | |
|---|---|---|---|
| 2,183,145 A | 12/1939 | Wilhelm et al. | |
| 4,139,550 A | 2/1979 | Seitzer | |
| 4,290,924 A | 9/1981 | Leach | |
| 4,436,834 A | 3/1984 | Wright | |
| 4,686,313 A | 8/1987 | Bell et al. | |
| 2003/0120118 A1 | 6/2003 | Betts et al. | |
| 2004/0106517 A1* | 6/2004 | Dlamini et al. | 502/326 |
| 2005/0203194 A1 | 9/2005 | Botes et al. | |
| 2007/0142481 A1* | 6/2007 | Steynberg et al. | 518/726 |

FOREIGN PATENT DOCUMENTS

GB    631457    11/1949

* cited by examiner

*Primary Examiner*—Jafar Parsa
(74) *Attorney, Agent, or Firm*—Finnegan, Henderson, Farabow, Garrett & Dunner, L.L.P.

(57) ABSTRACT

According to the present invention there is provided the use of a source of chromium in combination with a precipitated iron catalyst in a high temperature Fischer-Tropsch process to convert CO and $H_2$ to hydrocarbons and possibly oxygenates thereof. In the process CO and $H_2$ are contacted with the source of chromium in combination with the precipitated iron catalyst in a high temperature Fischer-Tropsch reaction. The invention also relates to the use of a source of chromium in the preparation of a precipitated iron catalyst for use in high temperature Fischer-Tropsch process and to a precipitated iron catalyst suitable for use in a high temperature Fischer-Tropsch process which contains a source of chromium.

19 Claims, No Drawings

USE OF A SOURCE OF CHROMIUM WITH A PRECIPITATED CATALYST IN A FISCHER-TROPSCH REACTION

FIELD OF THE INVENTION

This invention relates to the use of a source of chromium in combination with a precipitated iron catalyst in a high temperature Fischer-Tropsch process. The invention also relates to a high temperature Fischer-Tropsch process wherein a source of chromium is used and also to a precipitated iron catalyst which includes a source of chromium.

BACKGROUND OF THE INVENTION

A Fischer-Tropsch process comprises the hydrogenation of CO in the presence of a catalyst based on Group VIII metals, such as Fe, Co and Ru. The products formed from this reaction are gaseous, liquid and waxy hydrocarbons which may be saturated or unsaturated. Oxygenates of the hydrocarbons such as alcohols, acids and aldehydes are also formed. The carbon number distribution of the products follow the well-known Anderson-Schulz-Flory distribution.

A heterogeneous Fisher-Tropsch process may be conveniently categorised as either a high temperature Fischer-Tropsch (HTFT) process or a low temperature Fischer-Tropsch (LTFT) process. The HTFT process can be described as a two-phase Fischer-Tropsch process. It is usually carried out at a temperature from 250° C. to 400° C. and the catalyst employed is usually an iron-based catalyst, usually a fused iron catalyst. At the temperatures used for this process both the reactants and the products are in a gas phase in the reaction zone, and the catalyst, which is a solid, forms the second phase. Generally the process is commercially carried out in a fluidised bed reactor and the products obtained are of higher olefinicity and shorter chain length (that is products in the gasoline and diesel range) compared to the products of the LTFT process.

The LTFT process can be described as a three-phase Fischer-Tropsch process. It is usually carried out at a temperature from 240° C. to 310° C. and the catalyst employed is usually a Co-based catalyst, but it can also be a Fe-based catalyst. The conditions under which this process is carried out, results in the products being in a liquid phase in the reactor. Therefore this process can be described as a three-phase process, where the reactants are in the gas phase, the products are in the liquid phase and the catalyst is solid in the reaction zone. Generally this process is commercially carried out in a fixed bed reactor or a slurry bed reactor. The products from this process are heavier hydrocarbons such as waxes. A fluidised bed reactor cannot be used in the LTFT process, as the liquid product will cause adhesion of the solid catalyst particles, which will affect the fluidisation properties of the catalyst.

Since the HTFT and LTFT processes are different, the catalyst that is used in each of the processes will be different. The catalyst is generally optimised for a specific process and for the attainment of a specific range of products.

As stated above, the catalyst which is commonly used in the HTFT process is a fused iron catalyst and this catalyst is promoted, usually with a source of alkali or alkaline earth metals. Fused catalysts have a high mechanical strength which is required due to the robust conditions in a fluidised bed where rapid mixing of the two phases takes place at a high temperature.

Fused iron catalysts are usually prepared from low impurity iron sources, e.g. mill scale. The process for preparing a fused iron catalyst usually entails mill scale from a steelwork being fused together with desired amounts of promoters to obtain molted iron. The molten iron is cast into ingots and the latter is crushed and then milled in a ball mill to the required particle size. A major disadvantage is that the supply is dependent on the throughput of steelworks and the impurity levels in the mill scale are not always consistent, which has a negative influence on the catalyst performance.

Another type of catalyst used in Fischer-Tropsch processes is a precipitated catalyst. In these catalysts improved control over impurity levels can be obtained, but they have always suffered from the disadvantage that precipitated catalyst particles are not sufficiently robust to be used in fluidised bed reactors of the HTFT process. Accordingly, precipitated catalysts have usually only been used in LTFT processes. However, PCT/ZA01/00084, filed by the same applicant of the present application, discloses an iron based precipitated catalyst of sufficient mechanical strength to be used in a fluidised bed of a HTFT process. In that case an iron product was precipitated from a solution containing a dissolved iron salt and the precipitated product (containing certain promoters) was then heat treated under reducing conditions to provide a catalyst with a desired surface area and robustness to be used in a fluidised bed of a HTFT process.

The use of a source of chromium in combination with certain catalysts in certain Fischer-Tropsch reactions and in water-gas shift reactions has been reported in the past. Dry, M E, in "Catalysis-Science and Technology", Anderson, J R and Boudart, M (eds.) Springer-Verlag, Berlin, 159 (1981), discloses that the addition of $Cr_2O_3$ and $Al_2O_3$ lowered the catalyst performance of the Co-based LTFT catalyst. Storch, H H, Golumbic, N, Anderson, R B, in "The Fischer-Tropsch and Related Synthesis", John Wiley and Sons, New York, (1951), discloses the use of $Cr_2O_3$ as a promoter in an iron-based catalyst. This reference reports that the presence of $Cr_2O_3$ decreased the rate of formation of free carbon in the LTFT process.

Colley S E, Copperthwaite, R G, Hutchings, G J Foulds, G A, Coville, N J, in *Appl Catal*, 84, 1-15 1992 discloses the addition of chromium to a cobalt-manganese catalyst for a LTFT reaction which resulted in a substantial increase in the selectivity towards $C_{25}$ to $C_{35}$ hydrocarbons. In this work, a 20% chromium loading produced an increase in alpha value, as well as an increase in $C_{16}^+$ selectivity from 6.9 to 24.2 mass percent compared to the unpromoted system. This shift towards heavier products was naturally accompanied by a decrease in the yield of light hydrocarbons. The $C_2$ olefin to paraffin ratio was observed to decrease, but the ethylene yield was constant, suggesting that the polymerisation capability of the catalyst was not enhanced. High activity of the CO-catalyst is also mentioned.

Perez, M, Diaz, L, Galinda, H de J, Dominguez, J M, Salmon M; *Rev. Soc. Quim. Mex.*, 43(3,4) 97-99 (1999) is a study of cobalt catalysts wherein a series of Cu—Co—Cr oxides doped with alkali metals (M) was prepared by co-precipitation of metal nitrates and $M_2CO_3$ in an aqueous solution. The calcined products were used as catalysts for a LTFT process in a stainless-steel fixed bed microreactor. The composition was chosen with the intention of producing both higher alcohols and hydrocarbons. Methanol, ethanol and 2-propanol were the predominant alcohols formed, and the inclusion of sodium or cerium had the greatest effect on hydrocarbon yield. Chromium was used in this case as an alcohol promoter.

In Zhang, Y, Zhong, B, Wang Q; Cuihua Xuebao, 18 (6), 513-516, (1997) the addition of Cr to a $ZrO_2$—$SiO_2$ supported Co catalyst resulted in lower CO conversion and $C_{5+}$ selectivity, with an increase in methane production in a LTFR process. Similarly Lapidus, A C, Krylova, A Y, Sineva, L V, Durandina, Y V, Motorina, S N; Khim, Tverd. TopL.; (1), 32-38, (1997) discloses that $Cr_2O_3$ and alumina decreased the yield of liquid hydrocarbons in a LTFT process.

CN 1140630 discloses a catalyst prepared by co-precipitation and impregnation. This catalyst comprised 80-90% iron oxide, 5.0-15% $Cr_2O_3$, 1.0-5.0% copper oxide, 0.5-5.0% rare earth oxide (eg cerium oxide), and was suitable for CO conversion via water-gas-shift with suppressed Fischer-Tropsch activity.

The prior art referred to above all relate to LTFT processes, or to a water-gas-shift reaction in the case of CN 1140630, and most refer to Co-based catalysts. From this prior art it is clear that the addition of chromium provided very mixed results. For example in some cases an increased selectivity of heavier hydrocarbons was observed but in other cases the reverse was observed.

It was most surprisingly found that the addition of a source of chromium to an iron based precipitated catalyst resulted in certain advantages when the said precipitate catalyst was used in a HTFT process.

SUMMARY OF THE INVENTION

According to the present invention there is provided the use of a source of chromium in combination with a precipitated iron catalyst in a high temperature Fischer-Tropsch process to convert CO and $H_2$ to hydrocarbons and possibly oxygenates thereof, by contacting CO and $H_2$ with the source of chromium in combination with the precipitated iron catalyst in a high temperature Fischer-Tropsch reaction.

Preferably the use of the source of chromium in combination with the precipitated iron catalyst is to achieve at least one result selected from the group consisting of:
  reducing the concentration of organic acid in the hydrocarbons and oxygenates thereof formed by the Fischer-Tropsch process;
  increasing the activity of the precipitated iron catalyst to convert CO and $H_2$ to hydrocarbons and possibly oxygenates thereof;
  reducing the concentration of methane formed by the Fischer-Tropsch process;
  reducing the formation of free carbon on the precipitated iron catalyst;
  increasing the concentration of branched hydrocarbons and possibly oxygenates thereof formed by the Fischer-Tropsch process;
  increasing the concentration of oxygenates of hydrocarbons formed by the Fischer-Tropsch process; and
  increasing the concentration of C4+ hydrocarbons and oxygenates thereof formed by the Fischer-Tropsch process.

Preferably the use of the source of chromium in combination with the precipitated iron catalyst is to achieve at least one (preferably at least two, preferably all three) result selected from the group consisting of:
  reducing the concentration of organic acid in the hydrocarbons and oxygenates thereof formed by the Fischer-Tropsch process;
  increasing the activity of the precipitated iron catalyst to convert CO and $H_2$ to hydrocarbons and oxygenates thereof; and
  reducing the concentration of methane formed by the Fischer-Tropsch process.

It will be appreciated that the results achieved are compared to a high temperature Fischer-Tropsch process wherein the same conditions are employed except that the source of chromium is not present.

According to a second aspect of the present invention there is provided the use of a source of chromium in the preparation of a precipitated iron catalyst for use in a high temperature Fischer-Tropsch process to convert CO and $H_2$ to hydrocarbons and possibly oxygenates thereof.

According to a third aspect of the present invention there is provided a high temperature Fischer-Tropsch process wherein CO and $H_2$ are converted to hydrocarbons and possibly oxygenates thereof by contacting the CO and $H_2$ with a precipitated iron catalyst in combination with a source of chromium in a high temperature Fischer-Tropsch reaction.

Source of Chromium

Preferably the source of chromium is incorporated into the precipitated iron catalyst. Preferably the concentration of the source of chromium in the precipitated iron catalyst is from 0.1 gCr/100 g Fe to 2 gCr/100 g Fe. Preferably from 0.2 gCr/100 g Fe to 1.5 g Cr/100 g Fe, more preferably from 0.3 g/100 g Fe to 1 gCr/100 g Fe. Preferably the source of chromium as incorporated in the precipitated catalyst is an oxide of chromium and preferably it is $Cr_2O_3$.

Preferably a source of chromium is incorporated into the precipitated catalyst during the formation of the precipitated catalyst by means of a precipitation procedure. Preferably a source of chromium is added in the form of a chromium salt, preferably a water-soluble chromium salt. Preferably the chromium salt is added as a solution (preferably an aqueous solution) during the production of the precipitated catalyst and causing it to precipitate during the process. In one embodiment of the invention a chromium salt in the form of chromium (III) nitrate as an aqueous solution was used. It is believed that in use it precipitated as CrOOH. During heat treatment the CrOOH is believed to have converted to $Cr_2O_3$. Other chromium salts such as $Cr(NO_3)_2OH$ may also be used.

Precipitated Iron Catalyst

The precipitated iron catalyst may be an iron catalyst prepared by any suitable precipitation process. Preferably, the precipitated iron catalyst is an iron catalyst prepared by digestion-oxidation precipitation.

The precipitated iron catalyst may be an iron catalyst prepared by a process comprising the steps of:
  precipitating an iron product in the form of iron and/or an iron composition from an iron containing solution;
  adding at least one catalyst promoter prior, during or subsequent to the precipitation process; and
  subjecting the precipitated iron product to heat treatment to provide the catalyst with a decreased surface area.

Preferably the precipitated iron catalyst is a reduced precipitated iron catalyst prepared by a process comprising the steps of:
  precipitating an iron product in the form of iron and/or an iron composition from an iron containing solution;
  adding at least one catalyst promoter prior, during or subsequent to the precipitation process;
  subjecting the precipitated iron product to heat treatment to provide the catalyst with a decreased surface area; and
  subjecting the iron product to reducing conditions to reduce the iron product to metallic iron.

Preferably the reduced precipitated iron catalyst has a surface area of below 60 $m^2$ per gram of catalyst.

Preferably a source of chromium is introduced into the precipitated iron catalyst prior, during or subsequent to the precipitating process of the iron product. In one embodiment of the invention the source of the chromium is introduced subsequent to the precipitating process of the iron product.

Preferably a source of chromium is added in the form of a chromium salt, preferably a water soluble chromium salt. Preferably the chromium salt is added as a solution (preferably an aqueous solution) during the production of the precipitated catalyst and causing it to precipitate during the process. In one embodiment of the invention a chromium salt in the form of chromium (III) nitrate as an aqueous solution was used. It is believed that in use it precipitated as CrOOH. During heat treatment the CrOOH is believed to have convented to $Cr_2O_3$. Other chromium salts such as $Cr(NO_3)_2OH$ may also be used.

The precipitated iron catalyst preferably comprises a precipitated Iron catalyst as described in PCT/ZA01/00084 which is incorporated herein by reference. However, in a preferred embodiment of this invention a source of chromium is introduced into the precipitated iron catalyst, prior, during or subsequent to the precipitation procedure. It will be appreciated that the source of chromium serves as a catalyst promoter.

The precipitated iron catalyst preferably comprises a precipitated iron product in the form of iron and/or an iron composition; and at least one catalyst promoter. Preferably the catalyst is reduced and preferably it has a surface area of below 60 $m^2$ per gram of catalyst.

The catalyst may also include Cu. It is believed that the Cu enhances reduction of the precipitated iron catalyst. The Cu may be added as a copper salt, preferably a water soluble salt. The Cu may be present in a low concentration, preferably below 1 gCu/100 gFe.

The precipitated iron product may be the product formed due to the precipitation of an iron salt. The iron salt may comprise a salt selected from the group consisting of iron nitrate; iron oxalate; iron sulphate and iron chloride. In one preferred embodiment of the invention is comprises Iron nitrate.

The iron salt may be precipitated from an aqueous solution.

The precipitated iron product may be precipitated in the presence of an alkali. The alkali may comprise a hydroxide. The alkali may comprise carbonate compound. In one embodiment of the invention it comprises ammonium hydroxide.

The precipitated iron composition may comprise an iron oxy hydroxide which at least partly converts to an iron oxide upon drying which in turn at least partly converts to iron upon reduction. Accordingly, in the reduced form of the catalyst the iron product comprises at least some iron.

In addition to the source of chromium the catalyst promoter may also comprise a source of an alkali metal and/or an alkaline earth metal. Preferably it comprises an alkali metal oxide or an alkaline earth metal oxide. The alkali metal oxide may be selected from the group consisting of $Na_2O$, $K_2O$ and $Cs_2O$. In one embodiment of the invention it may comprise $Na_2O$.

The concentration of the source alkali or alkaline earth metal catalyst promoter in the catalyst may be varied to maximise the activity and selectivity of the catalyst.

Where $Na_2O$ is the promoter, $Na_2O$ may be present at a concentration from 0.01 $Na_2O$/100 g Fe to 2.0 g $Na_2O$/100 g Fe, preferably from 0.05 $Na_2O$/100 g Fe to 1.0 g $Na_2O$/100 g Fe, preferably about 0.1 to 0.5 g $Na_2O$/100 g Fe. Other sources of alkali metal or alkaline earth metal may be used in amounts that will provide the same molar amounts of the alkali metal or alkaline earth metal as the above amounts provide for Na.

The surface area of the reduced catalyst may be smaller than 50 $m^2$/g catalyst, preferably 30 $m^2$/g catalyst or smaller; preferably 20 $m^2$/g catalyst or smaller; or even 10 $m^2$/g catalyst or smaller. The said surface area will normally not be smaller than 1 $m^2$/g catalyst.

The surface area may be determined by the classical method of Brunauer, Emmet or Teller (BET) which makes use of nitrogen adsorption isotherms. It will be appreciated that outer and inner "exposed" surface areas are measured.

The catalyst may also include substantially none or controllable minimal amounts of impurities. This is different to fused iron catalysts prepared from, for example, iron millscale which have variable amounts of impurities.

The impurities may be metal oxides other than the selected promoters which react with alkali metal or alkaline earth metal to form adducts which are undesirable since they are not active for the Fischer-Tropsch process and may give rise to unwanted products.

The catalyst may contain none or low (preferably consistent) levels of impurities such as $Al_2O_3$, $SiO_2$, MgO, CaO, $Li_2O$, $Na_2O$ and $TiO_2$ preferably $Al_2O_3$, $SiO_2$, MgO or CaO. The total amount of impurities may be present in the catalyst at below 5 g/100 gFe preferably below 2 g/100 gFe, preferably below 1 g/100 f Fe.

It has been found that reduced amounts of impurities allow reduced amount of source of alkali metal and/or alkaline earth metal promoter (especially $K_2O$) to be used. In particular, as the level of impurities is reduced the $K_2O$ promoter dilution in the catalyst matrix, which is dependent on the amount of the impurities present, is also reduced.

There is a tendency for a source of alkali metal and/or alkaline earth metal promoter to be consumed in the matrix by combination with impurities to form substantially inert compounds such as potassium silicate, therefore requiring that the amount of promoter [especially $K_2O$ ] used in the catalyst preparation stage to be increased to replenish the consumed portion. It is believed that this is not the case when a precipitated catalyst is used in contrast to the conventional fused iron catalyst process. Thus the amount of source of alkali metal and/or alkaline earth metal promoter [especially $K_2O$] that is required to induce the desired promotional effects may also reduce proportionally to the level of impurities.

The catalyst may have a particle size from 1 to 250 μm, preferably 2 to 200 μm preferably about 5 to 150 μm.

The catalyst may be a non-supported catalyst.

Prior to reduction the precipitated catalyst may have a surface area below 100 $m^2$ per gram of catalyst. Preferably the non-reduced catalyst may have a surface area from 80 $m^2$/g catalyst or less, preferably from 50 $m^2$/g catalyst or even from 10 to 50 $m^2$/g of catalyst.

It is foreseen that reduction and heat treatment may take place at the same time. Preferably however, heat treatment will take place prior to reduction, that is the heat-treated iron product will subsequently be reduced.

In one embodiment of the invention the iron composition may be precipitated by means of reverse precipitation wherein an alkali is added to the iron containing solution. Preferably the alkali is in the form of a solution, preferably an aqueous solution.

In another embodiment of the invention the iron composition may be precipitated by means of forward precipitation wherein the iron containing solution is added to an alkali, preferably an alkali solution.

The precipitation temperature and pH may be varied and the two parameters eventually have an influence on the surface area of the final catalyst particles.

Precipitation may be carried out at a temperature of 0° C. to 100° C., typically 10° C. to 60° C., and even from 20° C. to 40 C. Precipitation may be carried out at ambient temperature.

The final pH of the solution containing the precipitate may be 5.0 to 9.0, typically 6.0 to 8.0 or even 6.5 to 7.5.

In another embodiment of the invention the iron composition may be precipitated at a substantially constant pH wherein the iron containing solution and an alkali are added to each other in order to retain the pH substantially constant, preferably at a range between 6-9, typically at a pH of about 7.5±0.2.

The catalyst promoter in the form of the source of alkali metal and/or alkaline earth metal may be co-precipitated with the iron product. Alternatively the said promoter may be added to the precipitated iron product. The precipitated iron product may be impregnated with the catalyst promoter.

A source of chromium may be co-precipitated with the iron product. Alternatively the said source of chromium may be added to the precipitated iron product. The precipitated iron product may be impregnated with the source of chromium. The heat treatment may be carried out at a temperature from 140° C. or higher, preferably from 140 to 600° C., preferably from 300 to 450° C.

The heat treatment may be carried out for longer than 15 minutes, preferably longer than 1 hour. The heat treatment may be carried out in air. During the heat treatment the surface area is preferably decreased by at least 20%.

Prior to the heat treatment the catalyst may be dried.

In one preferred embodiment of the invention the catalyst may be spray dried. The spray drying may take place at an inlet temperature between 250 and 500° C. preferably between 300 and 400° C. preferably at about 350° C. The outlet temperature may be between 80 and 180° C., preferably between 100 and 150° C., preferably at about 100° C.

The spray drying process may result in spherical catalyst particles in contrast to the fused catalytic material which is non-spherical and irregular. Spherical particles are generally preferred.

The spray dried particles may have a particle size from 1 to 250 μm, preferably 5 to 150 μm.

The reduction process comprises heat treatment under reducing conditions. The reducing conditions may be provided by using a reducing gas such as $H_2$ and/or CO. The heat treatment may be in excess of 200° C. In the process iron oxide is reduced to metallic iron.

Preferably at least 70% (mass/mass), preferably at least 80% (mass/mass) and more preferably at least 90% (mass/mass) of iron is reduced to be in the form of metallic iron. Preferably substantially all iron is reduced to metallic iron.

The High Temperature Fischer-Tropsch (HTFT) Process

The HTFT process is a two-phase Fischer-Tropsch process wherein the reactants and products are in a gas phase and the catalyst is in a solid phase.

Preferably the process is carried out in a fluidised bed reactor. In a typical embodiment of the invention the HTFT process is conducted in a fixed fluidised bed reactor.

The process may be carried out at a pressure from 10 to 60 bar (1 to 6 MPa), typically at about 15 to 30 bar (1.5 to 3 MPa), within a temperature range between 250° C. and 400° C., typically from 270° C. to 370° C., and even from 330° C. to 350° C.

The composition of the total synthesis gas feed generally comprises $H_2$ and CO in an $H_2$:CO molar ratio in the range of about 5:1 to about 1:5, typically at 4:1.

Typically, the feed synthesis gas may also comprise about 1 to 25 volume percent $CO_2$, $N_2$ and/or methane.

The products of the process may comprise a mixture of linear, branched chain and aromatic hydrocarbons. The hydrocarbons may essentially comprise paraffins and olefins. The products of the process may also include oxygenates of hydrocarbons.

According to another aspect of the present invention there is provided a precipitated iron catalyst suitable for use in a high temperature Fischer-Tropsch process which contains a source of chromium from 0.1 gCr/100 g Fe to 2 gCr/100 g Fe.

Preferably the precipitated catalyst comprises a reduced precipitation catalyst.

EXAMPLES

All catalysts were prepared by reverse precipitation or continuous precipitation at room temperature (approximately 25° C.).

For the reverse precipitation, up to 100 ml 25% (v/v) $NH_4OH$ solution was added dropwise, whilst stirring with an overhead stirred, to 400 ml of 1M aqueous solution of $Fe(NO_3)_3.9H_2O$ (161.6 g) until a pH of 7. Thereafter, 0.075 g $Na_2CO_3$, 0.48 g $Cu(NO_3)_2.3H_2O$ was added to the precipitation mixture, together with the required amount of $Cr(NO_3)_3.9H_2O$ to achieve 0.3, 0.5 and 1 g Cr/100 g Fe. This amounted to 0.67 g, 0.89 g and 1.9 g $Cr(NO_3)_3.9H_2O$) respectively. There was no chromium salt added to a fourth catalyst, which served as a point of reference.

Continuous precipitation entails co-feeding two solutions, one containing the metal salts and the other the ammonium hydroxide which is the precipitating agent. During the continuous precipitation the 25% (v/v) $NH_4OH$ solution was co-fed together with the 1M iron nitrate solution until a pH of 7-8 was reached.

The resultant slurries were then dried in a fan-oven overnight (approximately 16 hours) at 150° C., and then calcined in air at 350° C. for 4 hours. Finally, the catalyst was crushed and screened to a particle size range of 38-150 μm.

Catalyst Testing Methodology 5 g calcined catalyst was loaded into a Berty gradientless microreactor and reduced in situ under hydrogen at 420° C. for 16 hours at 20 bar. Thereafter, synthesis gas was introduced at a syngas flowrate of 16 liters(n) per g catalyst ($pH_2$=11.5 bar, pCO=2.6 bar, $pCO_2$=2.4 bar) at 20 bar total pressure and at a temperature of 330° C. Analysis of hydrocarbon products was performed using GC-FID, and permanent gas analysis was done by GC-TCD. Wet chemical methods were used to quantify total acid make.

The results obtained are provided in Table 1 below.

TABLE 1

Results of chromium promotion of precipitated-iron catalyst containing 0.2 Na$_2$O and 0.56 Cu per 100 g Fe

| | CATALYST | | | | |
|---|---|---|---|---|---|
| | ANC | AMCCN3 | AMCCN1 | AMCCN4 | CACCN |
| Catalyst preparation method | Reverse precipitation | Reverse precipitation | Reverse precipitation | Reverse precipitation | Continuous precipitation |
| Cr loading (g Cr/100 g Fe) | 0 | 0.3 | 0.5 | 1 | 0.3 |
| BET surface area of calcined catalyst (m2/g) | 27.2 | 30.6 | 31.7 | 33.8 | 43 |
| BET surface area of reduced catalyst (m2/g) | 7.6 | 9.8 | 12.0 | 10.1 | 14.0 |
| % CO + CO$_2$ conversion | 36.79 | 49.12 | 47.11 | 47.62 | 44.00 |
| % CH$_4$ selectivity (C-atom %) | 13.93 | 10.46 | 10.49 | 10.99 | 12.00 |
| C$_2$ total (C-atom %) | 10.78 | 10.87 | 11.36 | 10.29 | 11.00 |
| C$_6$ total (C-atom %) | 6.0 | 6.2 | 7.2 | 7.7 | 8.2 |
| C$_8$ total (C-atom %) | 3.1 | 3.7 | 4.3 | 4.5 | 5.1 |
| C$_2$=/C$_{2-}$ | 4.56 | 6.36 | 5.81 | 4.80 | 4.5 |
| C$_3$=/C$_{3-}$ | 12.35 | 12.03 | 13.25 | 11.70 | 11.8 |
| 2-me-pentene/1-hexene | 0.055 | 0.068 | 0.067 | 0.069 | 0.080 |
| Methyl ethyl ketone (MEK) (C-atom %) | 0.25 | 0.43 | 0.48 | 0.62 | 0.40 |
| Acid number (mg KOH/g H$_2$O) Spent catalyst | 17.30 | 15.38 | 12.81 | 10.56 | 4.73 |
| Total Fe (mass %) | 35.346 | 64.83 | 68.8 | 68.26 | 66.2 |
| Total carbon/100 g Fe | 100.9 | 41.3 | 32.8 | 27.32 | 32.5 |
| Free carbon/100 g Fe | 92.3 | 32.7 | 24.2 | 18.7 | 30.3 |
| Carbon formation as free g C/100 g Fe · day | 13.1 | 4.7 | 3.4 | 2.7 | 3.2 |

The chromium loading (in gCr/100 gFe) was determined using AA or ICP analysis. The BET surface areas reported for the calcined (heat treated) catalysts, are the values of the catalyst prior to reduction. Selectivities (% CH4, C$_2$ total, C$_6$ total, C$_8$ total, MEK) are expressed as a mass C-atom percentage of CO converted to Fischer-Tropsch products. Hence olefin to paraffin ratio's are expressed in terms of mass, as well as the 2-me-pentene/1-hexene ratio. The acid number is a measure of the total water-soluble organic acid product, determined using wet chemical methods.

Discussion

From the values obtained from the acid number in Table 1 it is clear that the addition of Cr resulted in reduced formation of organic acids in the hydrocarbons and oxygenates thereof formed by the Fischer-Tropsch process. The % CO +CO$_2$ conversion figures shows that the addition of Cr increases the activity of the precipitated iron catalyst to convert CO and H$_2$ to hydrocarbons and oxygenates thereof. The addition of Cr also resulted in a reduction of the concentration of methane formed, and also resulted in a reduction of the formation of free carbon on the precipitated catalyst. The C$_2$=/C$_{2-}$ figures show an increased selectivity to the formation of at least certain olefinic compounds with Cr addition. The 2-me-pentene/1-hexene figures show an increased concentration of branched products formed due to Cr addition. The MEK values show an increase in the formation of oxygenates formed due to the Cr addition. The C$_6$ and C$_8$ total selectivity figures show an increased selectivity in the formation of heavier hydrocarbons and oxygenates thereof due to the addition of Cr.

The invention claimed is:

1. A two phase high temperature Fischer-Tropsch process wherein reactants in the form of CO and H$_2$ are converted to products in the form of hydrocarbons and possibly oxygenates thereof by contacting CO and H$_2$ with a precipitated iron catalyst in combination with a source of chromium as a catalyst promoter under high temperature Fischer-Tropsch conditions carried out in a fluidized bed reactor, wherein the reactants and the products are in a gas phase and the catalyst is in a solid phase.

2. The process of claim 1, which achieves at least one result selected from the group consisting of:
   reducing the concentration of organic acid in the hydrocarbons and oxygenates thereof formed by the Fischer-Tropsch process;
   increasing the activity of the precipitated iron catalyst to convert CO and H$_2$ to hydrocarbons and possibly oxygenates thereof;
   reducing the concentration of methane formed by the Fischer-Tropsch process;
   reducing the formation of free carbon on the precipitated iron catalyst;

increasing the concentration of branched hydrocarbons and possibly oxygenates thereof formed by the Fischer-Tropsch process;

increasing the concentration of oxygenates of hydrocarbons formed by the Fischer-Tropsch process; and increasing the concentration of C4+ hydrocarbons and possibly oxygenates thereof formed by the Fischer-Tropsch process.

3. The process of claim 2, which achieves at least one result selected from the group consisting of:

reducing the concentration of organic acid in the hydrocarbons and oxygenates thereof formed by the Fischer-Tropsch process;

increasing the activity of the precipitated iron catalyst to convert CO and $H_2$ to hydrocarbons and oxygenates thereof; and reducing the concentration of methane formed by the Fischer-Tropsch process.

4. The process of claim 1, wherein a source of chromium is used in the preparation of the precipitated iron catalyst.

5. The process of claim 1, wherein the source of chromium is incorporated into the precipitated iron catalyst.

6. The process of claim 5, wherein the concentration of the source of chromium in the precipitated iron catalyst is from 0.1 gCr/100 g Fe to 2 gCr/100 g Fe.

7. The process of claim 6, wherein the concentration of the source of chromium in the precipitated iron catalyst is from 0.3 g/100 g Fe to 1 g/Cr/100 g Fe.

8. The process of claim 5, wherein the source of chromium as incorporated into the precipitated catalyst is an oxide of chromium.

9. The process of claim 8, wherein the oxide of chromium is $Cr_2O_3$.

10. The process of claim 1, wherein the precipitated iron catalyst is an iron catalyst prepared by a process comprising the steps of:

precipitating an iron product in the form of iron and/or an iron composition from an iron containing solution;

adding at least said catalyst promoter prior, during or subsequent to the precipitation process; and subjecting the precipitated iron product to heat treatment to provide the catalyst with a decreased surface area.

11. The process of claim 1, wherein the precipitated iron catalyst is a reduced precipitated iron catalyst prepared by a process comprising the steps of:

precipitating an iron product in the form of iron and/or an iron composition from an iron containing solution;

adding at least said catalyst promoter prior, during or subsequent to the precipitation process;

subjecting the precipitated iron product to heat treatment to provide the catalyst with a decreased surface area; and subjecting the iron product to reducing conditions to reduce the iron product to metallic iron.

12. The process of claim 11, wherein the reduced precipitation catalyst has a surface area below 60 $m^2$ per gram of catalyst.

13. The process of claim 1, wherein the precipitated iron catalyst comprises a precipitated iron product in the form of iron and/or an iron composition and, in addition to said source of chromium as a catalyst promoter, at least one additional catalyst promoter.

14. The process of claim 13, wherein the additional catalyst promoter comprises a source of an alkali metal and/or an alkaline earth metal.

15. The process of claim 14, wherein the additional catalyst promoter comprises an alkali metal oxide or an alkaline earth metal oxide.

16. The process of claim 15, wherein the alkali metal oxide is selected from the group consisting of $Na_2O$, $K_2O$ and $Cs_2O$.

17. The process of claim 1, wherein the fluidized bed reactor is a fixed fluidized bed reactor.

18. The process of claim 1, wherein the process is carried out at a pressure from 10 to 60 bar (1 to 6 MPa).

19. The process of claim 1, wherein the process is carried out within a temperature range between 250° C. and 400° C.

* * * * *

UNITED STATES PATENT AND TRADEMARK OFFICE
CERTIFICATE OF CORRECTION

PATENT NO.       : 7,598,295 B2                                      Page 1 of 1
APPLICATION NO.  : 10/580022
DATED            : October 6, 2009
INVENTOR(S)      : Tracy Carolyn Bromfield It is certified that error appears in the above-identified patent and that said Letters Patent is hereby corrected as shown below:

In claim 7, column 11, line 28, "0.3 g/100 g Fe to 1 g/Cr/100 g Fe." should read --0.3 g Cr/100 g Fe to 1 g Cr/100 g Fe.--.

Signed and Sealed this

Thirteenth Day of April, 2010

David J. Kappos
*Director of the United States Patent and Trademark Office*